Oct. 11, 1932.   C. E. SPARHAWK   1,882,199
AIRPLANE
Filed Aug. 16, 1930   3 Sheets-Sheet 1
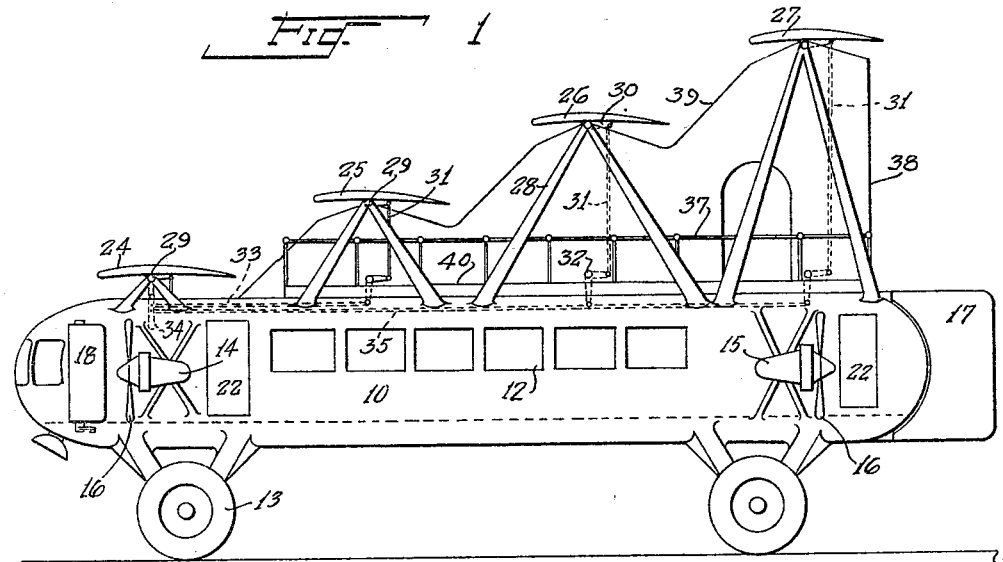
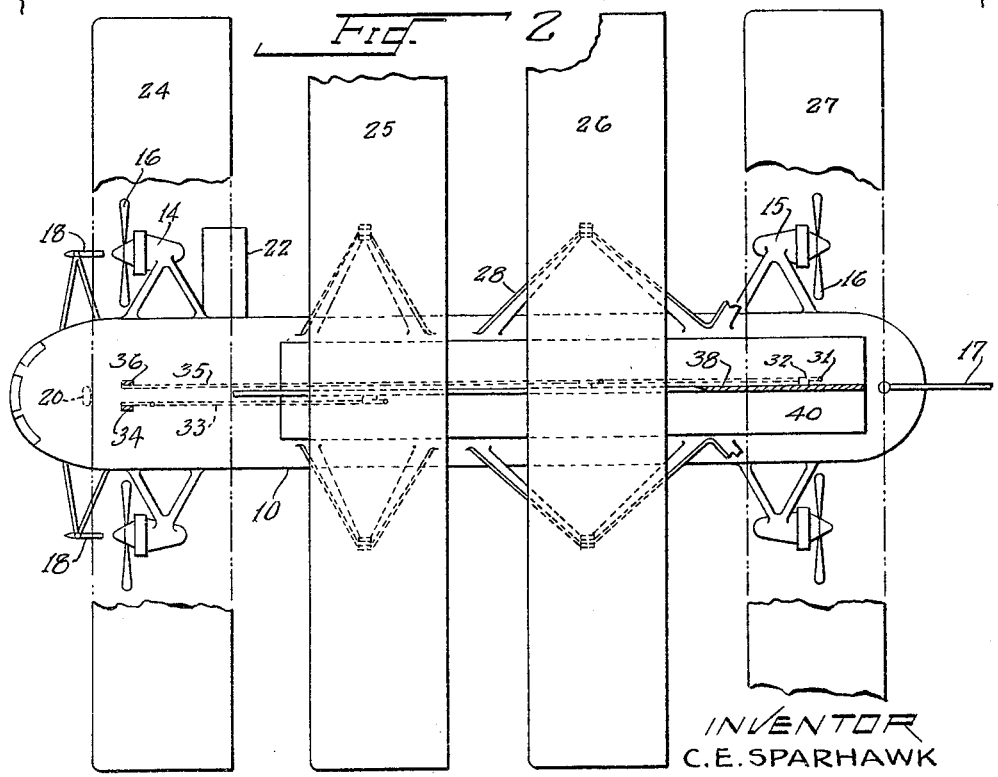
INVENTOR
C. E. SPARHAWK
ATTORNEY

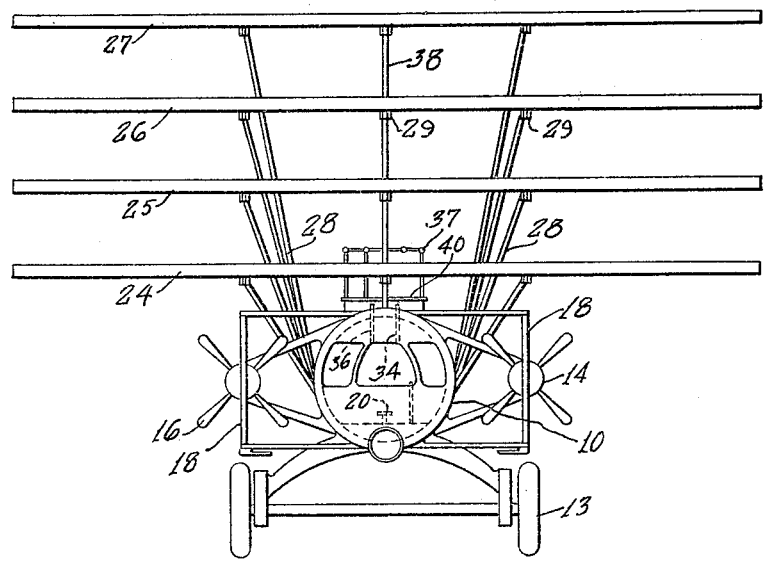
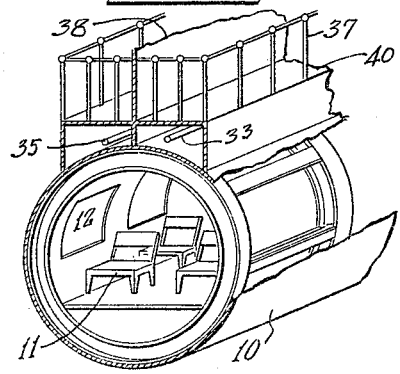
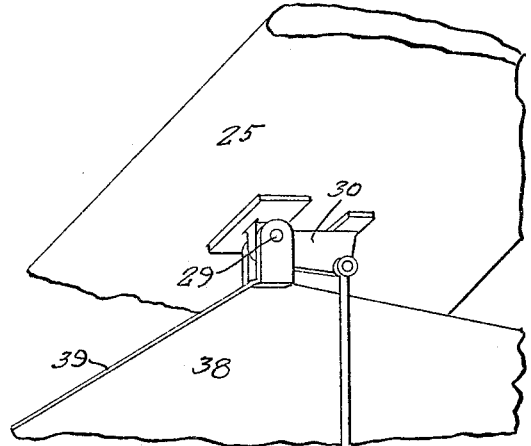
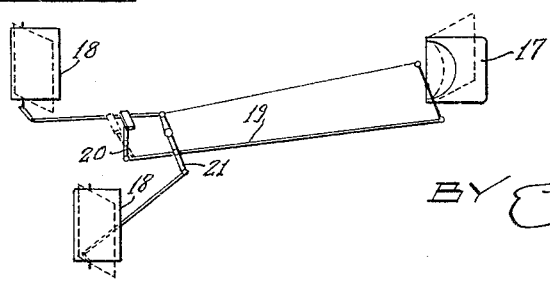

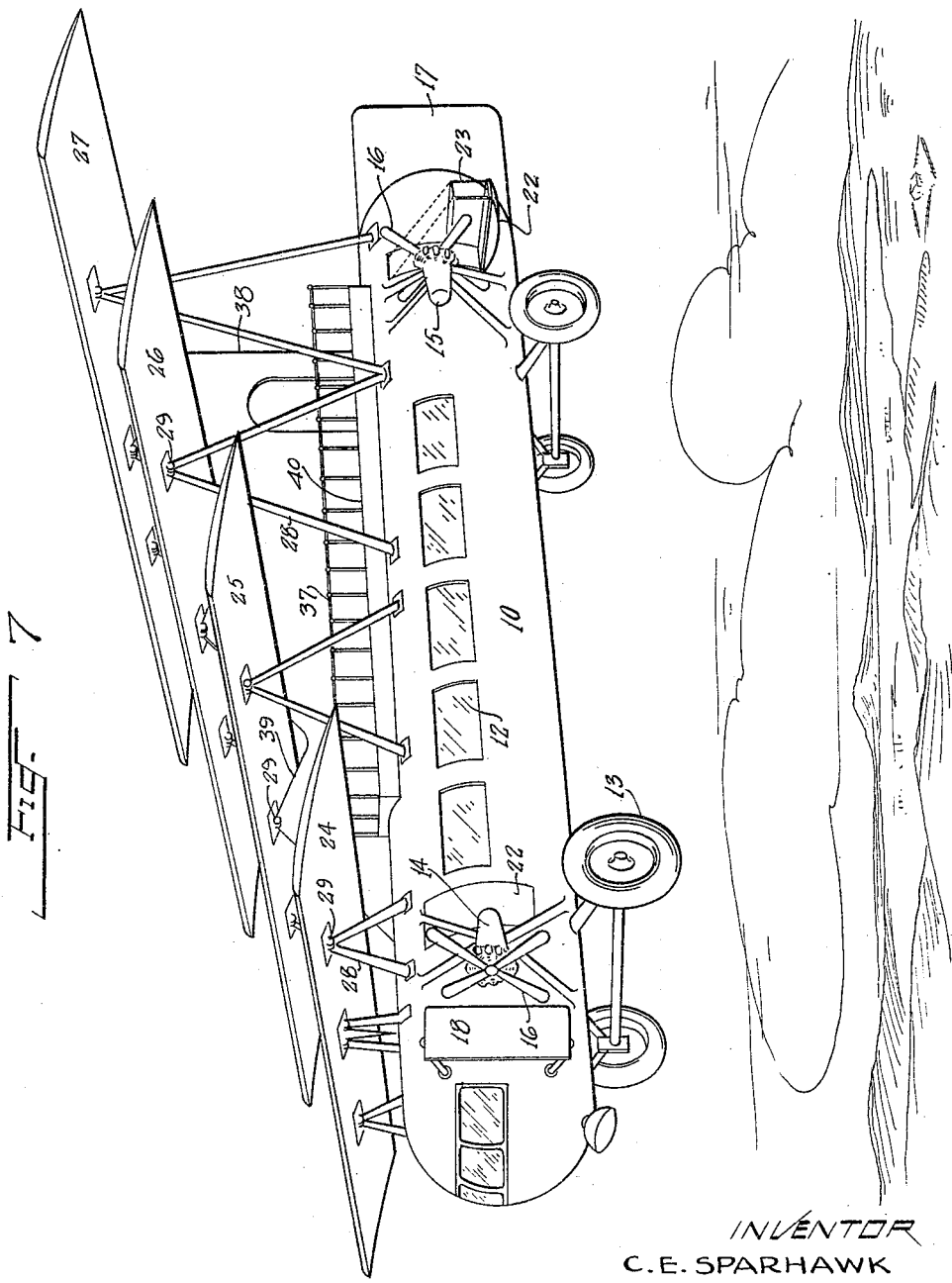

Patented Oct. 11, 1932

1,882,199

UNITED STATES PATENT OFFICE

CHARLES E. SPARHAWK, OF AUBURN, WASHINGTON, ASSIGNOR TO ADA YOUNG, OF KETCHIKAN, ALASKA

AIRPLANE

Application filed August 16, 1930. Serial No. 475,734.

This invention relates generally to aviation, and particularly to the heavier-than-air type of flying machine.

The main object of this invention is to provide an airplane having the maximum amount of lift and stability and capable of being easily controlled.

The second object is to provide an airplane whose wings themselves function as ailerons and serve to determine the direction of flight.

The third object is to provide an airplane having a plurality of wings so disposed as to enable them to encounter "new" air.

The fourth object is to produce an airplane having adjustable wings so constructed as to provide the maximum amount of rigidity and freedom from small or delicate parts.

The fifth object is to provide an airplane having an elongated fuselage whose motors are mounted on the sides of the front and rear ends and which are provided with downwardly swinging doors upon which the mechanic can stand while operating on the motors.

These, and other objects, will become more apparent from the specification following as illustrated in the accompanying drawings, in which:

Fig. 1 is a side elevation of the airplane.
Fig. 2 is a plan.
Fig. 3 is a front elevation.
Fig. 4 is a fragmentary perspective view showing the interior of the fuselage.
Fig. 5 is a perspective view showing in detail the wing mountings and controls.
Fig. 6 is a diagrammatic view of the rudder controls.
Fig. 7 is a perspective view of the entire machine.

Similar numbers of reference refer to similar parts throughout the several views.

Referring in detail to the drawings, there is shown a cylindrical fuselage 10 which forms the cabin for the passengers who occupy the seats 11. Windows 12 are provided along the sides of the fuselage 10.

The fuselage 10 is mounted on pneumatic wheels 13 by means of which the device may taxi along the ground in taking off or when making a landing. At each side of the fuselage 10 and near its opposite ends are the motors 14 and 15 for driving their respective propellers 16. The tail rudder 17 and front side rudders 18 are handled by the usual wire controls 19 and levers 20 and 21 (as shown in Fig. 6).

Behind the motors 14 and 15 are the downwardly swinging doors 22 upon which the mechanic stands while working on the motors. Each door 22 is provided with a guard rail 23 for safety purposes.

Turning now to the wings they will be seen to be four in number. The first or foremost wing 24 lies close to the top of the fuselage 10, while the remaining wings 25, 26 and 27 are of increased latitude with relation to the fuselage 10, which is considered as a horizontal object in describing the invention. Each of the wings 24 to 27 exclusive is mounted on the upright struts 28, the upper ends of which are attached to their respective wing by means of a hinge connection 29. Each of the wings is controlled by means of an angle bracket 30 which is joined by a connecting rod 31 to a bell crank lever 32 mounted on the top deck of the fuselage 10. The wings 24 and 25 are operated in unison by a connecting rod 33 and hand lever 34, while the wings 26 and 27 are operated in unison by the connecting rod 35 and the hand lever 36.

It is desirable to provide a rail 37 around the top of the deck.

Underneath the wings 25, 26 and 27 is an upright wall member 38 whose upper edge 39 is cut away to permit the free movement of the wings 25, 26 and 27. It is also desirable to provide a walk-way 40 on the top side of the deck extending practically the full length of the fuselage.

In operation the plane can be maneuvered perfectly by the separate or combined use of the various wing elements 24 to 27 or the rudder elements 17 and 18. It can also be seen that the presence of the wall 38 is sufficient to insure against side slip.

From the above it will be seen that a plane has been provided having unusually large wing capacity and that the controls for these wings are equal to their entire area and are no more delicate than are the wings themselves. Furthermore, it will be observed that the entire wing surface of each wing engages air not previously in contact with the more advanced wing.

I claim:

An airplane having in combination a longitudinal fuselage having a pair of wheels under the front and rear ends thereof, four transverse lifting wings hingedly mounted above said fuselage and transverse with relation thereto, each of said wings having means for varying its angularity with relation to the length of the fuselage, each succeeding wing after the first occupying a higher position than does its preceding wing, control means for operating the two rearmost wings in unison, control means for operating the two foremost wings in unison, and rudder means located at the center of the rear of the fuselage and at the sides of the front of the fuselage, together with a pair of tractor propellers at the front end of the fuselage and a pair of pusher propellers at the rear end of the fuselage.

CHARLES E. SPARHAWK.